United States Patent
Chao et al.

(10) Patent No.: US 6,894,956 B2
(45) Date of Patent: May 17, 2005

(54) MULTIMODE FILTER

(75) Inventors: Chi-Mou Chao, Hsinchu (TW); Hung-Jen Tseng, Hsinchu (TW)

(73) Assignee: Media Tek Inc., Hsin-Chu (TW)

( * ) Notice: Subject to any disclaimer, the term of this patent is extended or adjusted under 35 U.S.C. 154(b) by 662 days.

(21) Appl. No.: 09/893,438

(22) Filed: Jun. 29, 2001

(65) Prior Publication Data

US 2002/0150003 A1 Oct. 17, 2002

(30) Foreign Application Priority Data

Apr. 12, 2001 (TW) ........................................ 90108828 A

(51) Int. Cl.$^7$ ................................................. G11B 7/00
(52) U.S. Cl. ................ 369/44.29; 369/47.3; 369/47.38
(58) Field of Search .......................... 369/44.28, 44.27, 369/47.38, 47.39, 44.29, 44.26, 44.13, 44.42, 47.1, 47.41, 47.59, 44.35, 44.39, 47.3

(56) References Cited

U.S. PATENT DOCUMENTS

| | | | | |
|---|---|---|---|---|
| 6,055,219 A | * | 4/2000 | Ho et al. | 369/53.29 |
| 6,088,315 A | * | 7/2000 | Ando | 369/47.41 |
| 6,212,143 B1 | * | 4/2001 | Teshirogi et al. | 369/47.45 |

* cited by examiner

*Primary Examiner*—Nabil Hindi
(74) *Attorney, Agent, or Firm*—Andrew D. Fartney

(57) ABSTRACT

A multimode filter in an optical storage device is used for filtering an error signal and outputting a frequency signal. The multimode filter comprises a CLV and CAV mode filter and a switch. The CLV mode filter is used for filtering the error signal and extracting a narrow bandwidth signal, whereas the CAV mode filter is used for filtering the error signal and extracting a wide bandwidth signal. The switch is used for selecting either the CLV mode filter or the CAV mode filter according to the recording mode of the optical storage device.

20 Claims, 3 Drawing Sheets

MULTIMODE FILTER

REFERENCE TO RELATED APPLICATION

The present application claims priority from Taiwan Application No.090108828, entitled "Multimode filter," filed on Apr. 12, 2001.

BACKGROUND OF THE INVENTION

1. Field of the Invention

This invention relates generally to a multimode filter, and more particularly to a multimode filter in an optical storage device.

2. Description of the Related Art

Optical storage devices are widely utilized in many fields. CD-ROMs have become basic devices on personal computers (PCs). With the popularity of CD-Rs and CD-RWs, it is more convenient for users to record data or music. Conventionally, the recording mode of optical disk is constant linear velocity (CLV). As a result, recordable optical devices, for example CD-R, CD-RW, DVD-R, DVD-RW, DVD+RW or DVD-RAM, are recorded with CLV mode. It does not matter whether the position of the pick-up head of the optical device is at the outer or inner side of the optical disk, the speed of recording data into the disk is always kept constant. When the optical storage device operates with high rotational speed, the speed of data recording into the disk is limited by the rotational speed of the spindle motor. Such bottleneck can be resolved by using constant angular velocity (CAV) recording mode. For example, the rotational speed of the inner side of the disk is 8000 rpm when the optical storage device records data with 16× CLV mode. If the recording speed of the optical storage device is changed to 16× CAV mode at the inner side of the disk, the rotational speed at the outer side of the disk becomes 40×.

To label the location of the data in the disk, the tracks of the disk are divided into many sectors units. These sector units include minutes, seconds and blocks. A latest development in labeling is to form the edges of the tracks with a shape like a wave profile. As a result, when the disk is rotated, the reflected laser beam by the edges of the tracks with a shape like a wave profile forms a wobble signal. By using the frequency modulation (FM) the absolute time in pre-groove (ATIP) is encoded in the wobble signal. Thus, when the optical storage device receives the reflected signals from the reflected laser beam, it extracts the wobble signal from the reflected signals and decodes the wobble signal to attain the ATIP, thereby the position of the pick-up head is known.

FIG. 1A is the profile of a recordable disk. Disk 100 is a recordable disk, for example CD-R, CD-RW, DVD-R, DVD-RW, DVD+RW or DVD-RAM. The disk 100 is grooved with tracks 130 for data storage. FIG. 1B shows the detailed structure of tracks 130. As shown in FIG. 1B, the edges 135 of the tracks 130 are formed with a shape like a continuous wave profile. The position of the pick-up head is known by extracting the wobble signal and decoding the ATIP. Thus, extracting the wobble signal is critical for identifying the position of the pick-up head. FIG. 1C shows the relationship of a photo-detector (PD) and the tracks 130. The PD includes a sensor 171, a sensor 173, a sensor 175, and a sensor 177. The spot area 150 of the laser is shown by dotted line. The sensors 171, 173, 175, 177 can sense the laser simultaneously. When the optical storage device is using a CLV mode for recording, the frequency of the wobble signal is 22.05 KHz±1 KHz, where the center frequency is fixed to 22.05 KHz. Since the ATIP is encoded in the wobble signal, the ATIP can be known by extracting the wobble signal. A common way to extract the wobble signal is using the main beam push pull signal, i.e. the tracking error signal. If the values sensed by the sensors 171, 173, 175, 177 are A, B, C, and D respectively, then the main beam push pull signal is (A+D)−(B+C). By filtering the main beam push pull signal with a CLV mode filter of center frequency of 22.05 KHz, a narrow bandwidth wobble signal can be extracted.

Turning now to FIG. 2, it shows a device for extracting a wobble signal when the optical storage device is using CLV mode. By using a CLV mode filer 270 to filter a main beam push pull signal 250, the wobble signal 255 is extracted. Since the center frequency of the CLV mode filter 270 is 22.05 KHz when the speed of the optical storage device is 1×, the frequency of the narrow bandwidth wobble signal 255 extracted from the CLV mode filter 270 is also 22.05 KHz.

When the speed of the optical storage device with CLV mode is 1×, since the frequency of the wobble signal is fixed to 22.05 KHz±1 KHz, the wobble signal can be extracted by a filter with a fixed center frequency. However, when the optical storage device is using CAV mode, the frequency of the wobble signal increases with the linear velocity. The frequency of the wobble signal increases from 22.05 KHz to 22.05×2.505 KHz. In other words, the filter with fixed center frequency is not suitable for CAV mode. Since the frequency of the wobble signal is changed with the radial position of the pick-up head for CAV mode, a method is proposed for adjusting the center frequency of the filter dynamically to extract the wobble signal. However, the method can only be realized when the frequency of the wobble signal is known. The moving speed of the pick-up head is quite high when it is searching data; it is difficult to know the exact frequency of the wobble signal at the moment. Thus, the idea of dynamically adjusting the center frequency of a filter is not realized yet and becomes a bottleneck of developing CAV technology.

SUMMARY OF THE INVENTION

It is therefore an object of the present invention to provide a multimode filter to enhance the access speed of an optical storage device with CLV or CAV mode.

According to the object of the invention, a preferred embodiment is described as follows:

A multimode filter comprises a CLV mode filter, a CAV mode filter, and a switch. The center frequency of the CLV mode filter is fixed, and the CLV mode filter is used to extract a wobble signal for an optical storage device with CLV mode. The CAV mode filter comprises a high pass filter and a low pass filter. The CAV mode filter has a wide range of the operational frequency bandwidth and is used to extract a wobble signal for an optical storage device with CAV mode. By using the CLV mode filter, an error signal is filtered and a narrow bandwidth wobble signal is extracted. By using the CAV mode filter, an error signal is filtered and a wide bandwidth wobble signal is extracted. The switch is permitted to select either the CLV mode filter or the CAV mode filter according to the recording mode of the optical storage device.

Other objects and advantages of the present invention will become apparent from the following descriptions, taken in connection with the accompanying drawings, wherein, by way of illustration and example, an embodiment of the present invention is disclosed.

BRIEF DESCRIPTION OF DRAWINGS

The following detailed description, given by way of examples and not intended to limit the invention to the embodiments described herein, will be best understood in conjunction with the accompanying drawings, in which.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The idea of the present invention is using a CAV mode filter with wide bandwidth to extract a wobble signal. The bandwidth of the CAV mode filter can cover the frequency range of the wobble signal. Thus, no matter the pick-up head is located at the inner or outer side of a disk, the frequency range of the wobble signal is within the bandwidth of the CAV filter, so that the wobble signal can be extracted efficiently.

Figure 1A:
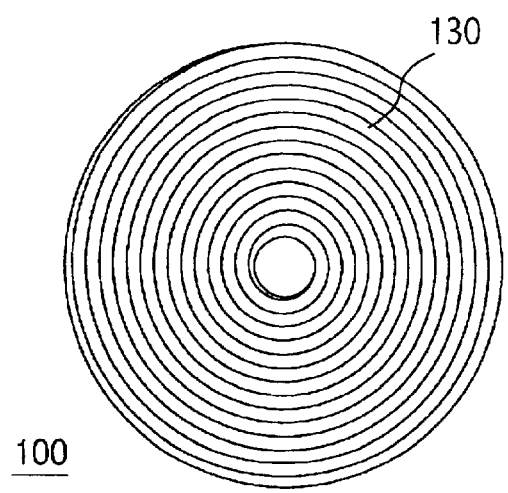
FIG. 1A is a diagram showing the profile of a recordable disk.
Figure 1B:
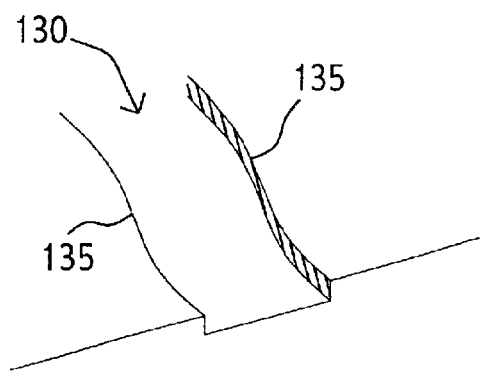
FIG. 1B is a diagram showing the detail structure of tracks.
Figure 1C:
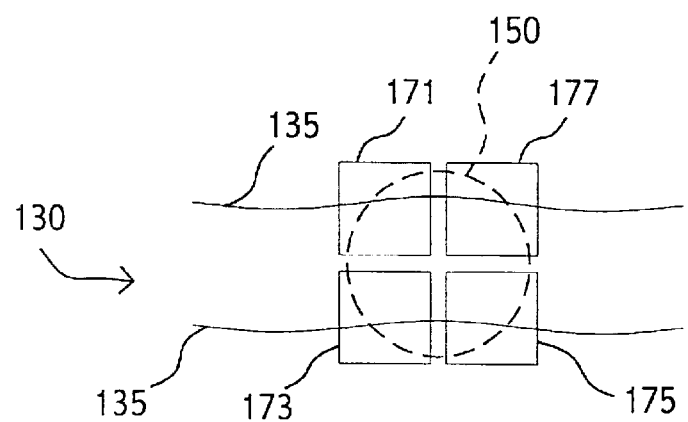
FIG. 1C is a diagram showing the relationship of a photo-detector and the tracks 130.
Figure 2:
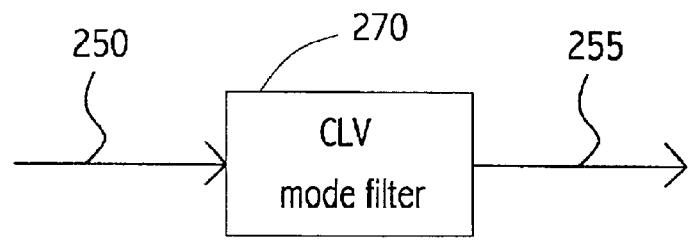
FIG. 2 is a diagram showing device for extracting a wobble signal when the optical storage device is using CLV mode.
Figure 3:
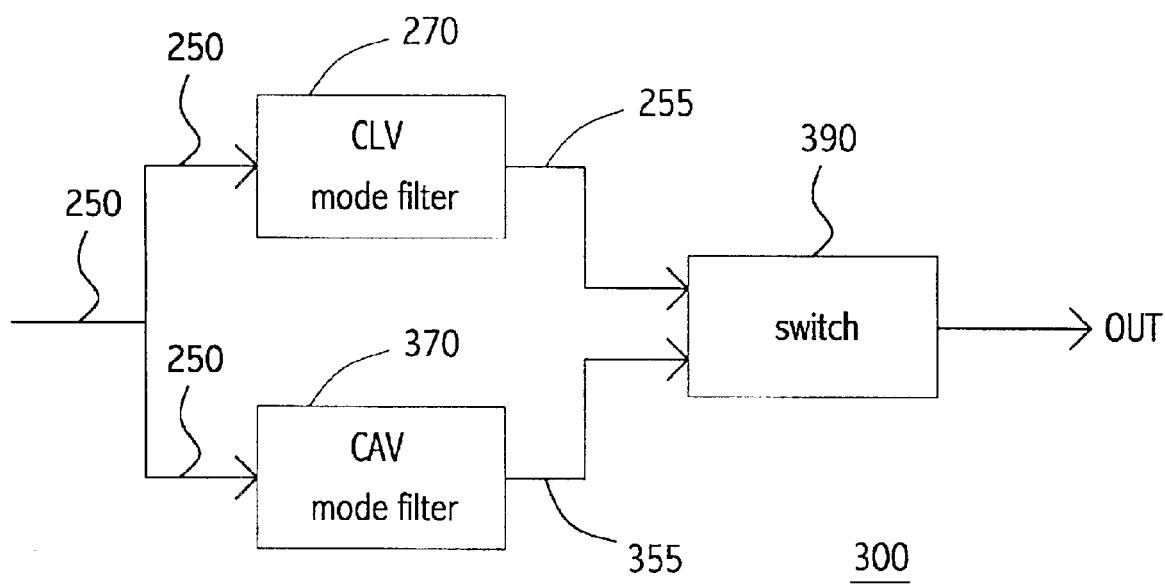
FIG. 3 is a block diagram of a multimode filter according to a preferred embodiment of the invention.

Turning now to FIG. 3, it shows a block diagram of a multimode filter according to a preferred embodiment of the invention. The multimode filter 300 comprises a CLV mode filter 270, a CAV mode filter 370, and a switch 390. Since the center frequency of the CLV mode filter 270 is 22.05 KHz, the CLV mode filter 270 is used to filter a main beam push pull signal 250 and extract a narrow bandwidth wobble signal 255 when the speed of the optical storage device is 1× using CLV mode. Since the operational frequency bandwidth of the CAV mode filter 370 is 22.05~55 KHz, the CAV mode filter 370 is used to filter the main beam push pull signal 250 and extract a wide bandwidth wobble signal 355 when the optical storage device is using CAV mode. In other words, if the optical storage device is operated in CLV mode, a switch 390 is then connected to the CLV mode filter 270 to output the narrow bandwidth wobble signal 255; if the optical storage device is operated in CAV mode, a switch 390 is then connected to the CAV mode filter 370 to output the wide bandwidth wobble signal 355. Thus, the optical storage device can change the operational frequency range of the multimode filter 300 according to the recording mode.

Figure 4:
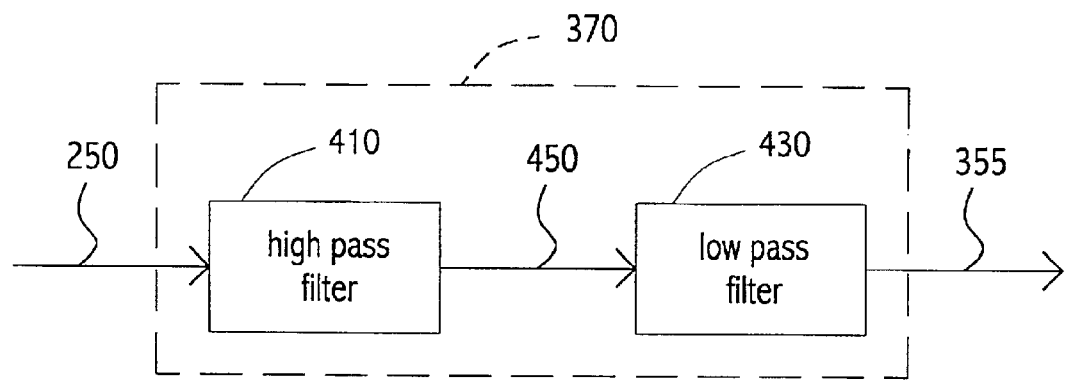
FIG. 4 is a block diagram of the CAV mode filter in FIG. 3.

Referring now to FIG. 4, it shows the block diagram of the CAV mode filter in FIG. 3. As shown in FIG. 4, the CAV mode filter 370 comprises a high pass filter 410 and a low pass filter 430. The high pass filter 410 filters the low frequency content of the main beam push-pull signal 250 and generates an intermediate signal 450, then feeds the intermediate signal 450 into the low pass filter 430 to filter the high frequency content and extracts the wide bandwidth wobble signal 355.

Figure 5:
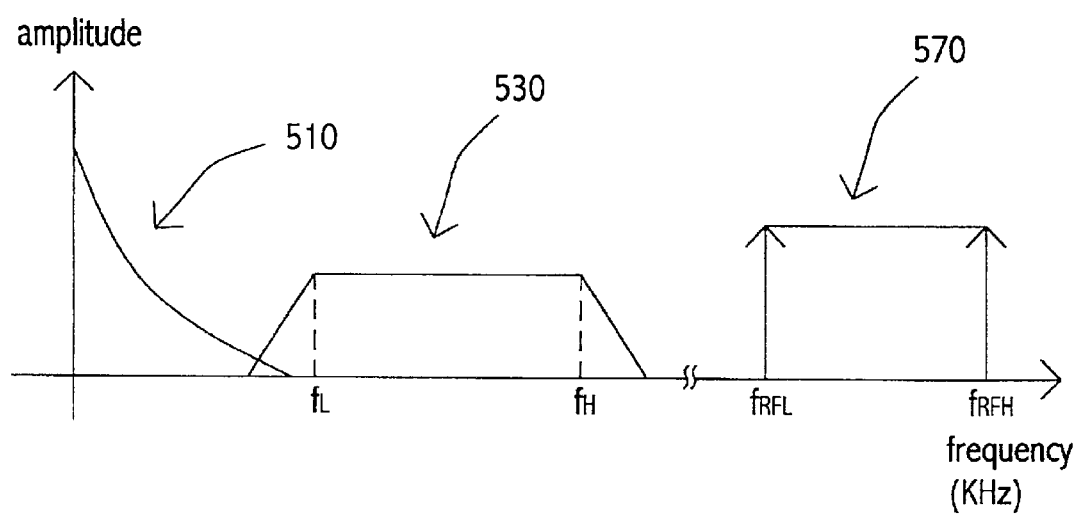
FIG. 5 is a diagram showing the distribution of servo error signals, radio frequency signals, and bandwidth of a CAV mode filter.

Further, FIG. 5 shows the Bode plot of servo error signals, radio frequency signals, and bandwidth of CAV mode filter. The servo error signals 510 are used for compensating the axial wobble and radial runout when the disk is rotated. Since the axial wobble and radial runout are both physical phenomena and usually results in low frequency error signals. The frequency of the servo error signals 510 are low, for example lower than 3 KHz, and the frequency does not change with the speed of the optical storage device. On the other hand, with the frequency response 530 of the CAV mode filter 370, the low corner frequency $f_L$ can be attained and represented as M×22.05 KHz and the high corner frequency can be attained and represented as $f_H$ is M×55 KHz, wherein the M is the CAV speed of the optical storage device. Thereby, the CAV mode filter 370 can extract the wide bandwidth wobble signal 355 by adjusting the bandwidth of the CAV mode filter 370 according to the CLV speed of the optical storage device. The data recorded on the disk is RF (Radio Frequency) signal recorded on the tracks 130. There are different length pits and lands formed on the tracks according to the data. The reflection rate of pits is different from lands, it is noted that the data is recorded with the variations of the reflection lights. After transforming the reflection lights, the RF signals 570 are attained. Since the frequency of the RF signals 570 are related to the rotational speed of the disk, the frequency of the RF signals 570 changes with the speed of the optical storage device. That is, the frequency of the RF signals 570 ranges from N×196 KHz to N×720 KHz, wherein the N is the CLV speed of the optical storage device.

As shown in FIG. 5, the operational frequency domain 530 ranges from M×22.05 KHz to M×55 KHz. Relatively, the frequency of the servo error signals 510 is low (lower than 3 KHz). Thus, the influence of the servo error signals 510 on the wobble signals 355 extracted from the CAV mode filter 370 is limited. Take the second order CAV mode filter 370 for example, the capability of noise depression over the servo error signals is −40 dB×log (22.05/3)=−34 dB. When the speed of the optical storage device increases, the frequency response 530 of the CAV mode filter 370 is enhanced, however the frequency of the servo error signals 510 does not change. In this way, capability of noise depression over the servo error signals is optimized. Thus, the influence of the servo error signals on wobble signals almost can be neglected when the speed of the optical storage device is high. Further, with the lowest frequency of the RF signals $f_{RFL}$, N×196 KHz and a high corner frequency of the CAV mode filter 370 $f_H$ is M×55 KHz, the capability of noise depression of the CAV mode filter 370 over the RF signals can be attained as −40 dB×log (196/55)=−22 dB. The resulted the capability of noise depression indicates that the RF signals do not interfere with the wobble signal. Moreover, when the speed of the optical storage device increases, the frequencies of the CAV mode filter and the RF signals are enhanced synchronously. The capability of noise depression of the CAV mode filter 370 is not affected by the difference speed used by the optical storage device.

It is disclosed above that the multimode filter of the present invention can be used for non-wobble signal depression, such as servo error signals or RF signals. In addition, the center frequency can be adjusted dynamically without outside frequency. Therefore, the invention is easy to implement, renders high performance and furthermore it meets the design requirement of the new optical storage device.

While the invention has been described with reference to various illustrative embodiments, the description is not intended to be construed in a limiting sense. Various modifications of the illustrative embodiments, as well as other embodiments of the invention, will be apparent to those skilled in the art upon reference to this description. It is therefore contemplated that the appended claims will cover any such modifications or embodiments as may fall within the scope of the invention defined by the following claims and their equivalents.

What is claimed is:

1. A multimode filter in an optical storage device for filtering an error signal signal and extracting a frequency signal, said multimode filter comprising:
   a CLV mode filter for filtering said error signal and extracting a narrow bandwidth signal;
   a CAV mode filter for filtering said error signal and extracting a wide bandwidth signal; and
   a switch for selection of the filter between CLV and CAV mode filter.

2. The multimode filter as claimed in claim 1, wherein said CAV mode filter comprises:
   a high pass filter for filtering said error signal and generating an intermediate signal; and
   a low pass filter that connects with said high pass filter for receiving and filtering said intermediate signal from the high pass filter.

3. The multimode filter as claimed in claim 2, wherein said high pass filter has a cutoff frequency of multiple times of 22.05 KHz.

4. The multimode filter as claimed in claim 2, wherein said low pass filter has a cutoff frequency of multiple times of 55 KHz.

5. The multimode filter as claimed in claim 1, wherein said frequency signal has a center frequency of multiple times of 22.05 KHz.

6. The multimode filter as claimed in claim 1, wherein said error signal comprises a tracking error signal.

7. The multimode filter as claimed in claim 1, wherein said optical storage device is selected from the group consisting of CD-R, CD-RW, DVD-R, DVD-RW, DVD+RW, and DVD-RAM.

8. An optical storage device having a multimode filter for filtering an error signal and extracting a frequency signal, said multimode filter comprising:
   a CLV mode filter for filtering said error signal and extracting a narrow bandwidth signal;
   a CAV mode filter for filtering said error signal and extracting a wide bandwidth signal; and
   a switch for selection of the filter between CLV and CAV mode filter.

9. The optical storage device as claimed in claim 8, wherein said CAV mode filter comprises:
   a high pass filter for filtering said error signal and generating an intermediate signal; and
   a low pass filter that connects with said high pass filter for receiving and filtering said intermediate signal from the high pass filter.

10. The optical storage device as claimed in claim 9, wherein said high pass filter has a cutoff frequency of multiple times of 22.05 KHz.

11. The optical storage device as claimed in claim 9, wherein said low pass filter has a cutoff frequency of multiple times of 55 KHz.

12. The optical storage device as claimed in claim 8, wherein said frequency signal has a center frequency of multiple times of 22.05 KHz.

13. The optical storage device as claimed in claim 8, wherein said error signal comprises a tracking error signal.

14. The optical storage device as claimed in claim 8, wherein said optical storage device is selected from the group consisting of CD-R, CD-RW, DVD-R, DVD-RW, DVD+RW, and DVD-RAM.

15. A multimode filtering method for filtering an error signal of an optical storage device, said multimode filtering method comprising:
   inputting an error signal to a multimode filter comprising a CLV and CAV mode filter;
   setting a frequency domain of said multimode filter in accordance with a recording mode of said optical storage device; and
   filtering said error signal and extracting a frequency signal.

16. The multimode filtering method as claimed in claim 15, wherein when said multimode filter is in a CAV mode, said method further comprises:
   high pass filtering said error signal and generating an intermediate signal; and
   low pass filtering said intermediate signal.

17. The multimode filtering method as claimed in claim 15, wherein said CLV mode filter has a center frequency of multiple times of 22.05 KHz, and the CAV mode filter has cutoff frequencies of multiple times of 22.05 KHz and 55 KHz.

18. The multimode filtering method as claimed in claim 15, wherein said frequency signal has a center frequency of multiple times of 22.05 KHz.

19. The multimode filtering method as claimed in claim 15, wherein said error signal comprises a tracking error signal.

20. The multimode filtering method as claimed in claim 15, wherein said optical storage device is selected from the group consisting of CD-R, CD-RW, DVD-R, DVD-RW, DVD+RW, and DVD-RAM.

* * * * *